United States Patent
Yochai et al.

(10) Patent No.: US 9,087,006 B2
(45) Date of Patent: *Jul. 21, 2015

(54) DESTAGING CACHED DATA IN MULTIPLE RECURRENCES IN A STORAGE SYSTEM

(75) Inventors: Yechiel Yochai, Moshav Aviel (IL); Michael Dorfman, Ramat HaSharon (IL); Efraim Zeidner, Haifa (IL)

(73) Assignee: INFINIDAT LTD., Herzliya (IL)

( * ) Notice: Subject to any disclaimer, the term of this patent is extended or adjusted under 35 U.S.C. 154(b) by 344 days.

This patent is subject to a terminal disclaimer.

(21) Appl. No.: 13/481,981

(22) Filed: May 29, 2012

(65) Prior Publication Data

US 2013/0326272 A1 Dec. 5, 2013

(51) Int. Cl.
*G06F 12/08* (2006.01)
*G06F 11/14* (2006.01)

(52) U.S. Cl.
CPC ........ *G06F 11/1441* (2013.01); *G06F 12/0868* (2013.01)

(58) Field of Classification Search
CPC . G06F 11/2074; G06F 11/2071; G06F 3/067; G06F 3/0605; G06F 3/0659; G06F 12/0246; G06F 3/0679; G06F 12/0866; G06F 12/0868; G06F 12/0871; G06F 2212/282; G06F 2212/283; G11C 16/102
See application file for complete search history.

(56) References Cited

U.S. PATENT DOCUMENTS

| | | | |
|---|---|---|---|
| 5,938,775 A | 8/1999 | Damani et al. | |
| 7,363,633 B1 | 4/2008 | Goldick et al. | |
| 8,627,012 B1 * | 1/2014 | Derbeko et al. | 711/135 |
| 8,818,951 B1 * | 8/2014 | Muntz et al. | 707/639 |
| 2004/0186968 A1 * | 9/2004 | Factor et al. | 711/162 |
| 2004/0260900 A1 * | 12/2004 | Burton et al. | 711/162 |
| 2005/0005070 A1 * | 1/2005 | Lam | 711/135 |
| 2005/0060607 A1 | 3/2005 | Kano | |
| 2005/0192991 A1 | 9/2005 | Nomoto et al. | |
| 2006/0041602 A1 | 2/2006 | Lomet et al. | |
| 2006/0129614 A1 | 6/2006 | Kim et al. | |
| 2006/0253624 A1 * | 11/2006 | Revah et al. | 710/52 |
| 2007/0061279 A1 | 3/2007 | Christiansen et al. | |
| 2007/0220309 A1 | 9/2007 | Andre et al. | |
| 2007/0220328 A1 | 9/2007 | Liu et al. | |
| 2007/0282921 A1 | 12/2007 | Atluri et al. | |
| 2008/0162590 A1 | 7/2008 | Kundu et al. | |
| 2010/0100529 A1 * | 4/2010 | Erofeev | 707/610 |
| 2010/0169592 A1 | 7/2010 | Atluri et al. | |
| 2011/0082997 A1 | 4/2011 | Yochai et al. | |
| 2012/0054152 A1 * | 3/2012 | Adkins et al. | 707/623 |
| 2012/0284544 A1 * | 11/2012 | Xian et al. | 713/320 |
| 2013/0326171 A1 * | 12/2013 | Pittelko | 711/162 |

* cited by examiner

*Primary Examiner* — Hal Schnee
(74) *Attorney, Agent, or Firm* — Reches Patents

(57) ABSTRACT

Storage system(s) for storing data in physical storage in a recurring manner, method(s) of operating thereof, and corresponding computer program product(s). For example, a possible method can include: upon start of a storage recurrence, destaging dirty data which had been accommodated in the cache memory prior to the start of said storage recurrence thus giving rise to destaged data group, wherein destaging is provided with no overwriting of at least superseded data destaged before starting said storage recurrence while enabling retaining metadata indicative of location of said superseded data in the physical storage space; accommodating data obtained in said cache memory subsequent to the start of said storage recurrence while preventing said data from being destaged during said storage recurrence, thus giving rise to accommodated data group; and registering a point-in-time indicative of successful destaging of the destaged data group, thereby providing an order-preservation consistency indication corresponding to said recurrence.

16 Claims, 2 Drawing Sheets

DESTAGING CACHED DATA IN MULTIPLE RECURRENCES IN A STORAGE SYSTEM

TECHNICAL FIELD

The presently disclosed subject matter relates to data storage systems and methods of operating thereof, and, in particular, to crash-tolerant storage systems and methods.

BACKGROUND

In view of the business significance of stored data, organizations face a challenge to provide data protection and data recovery with the highest level of data integrity. Two primary techniques enabling data recovery are mirroring technology and snapshot technology.

In an extreme scenario of failure (also known as a total crash), the ability to control the transfer of data between the cache memory and the storage space within the storage system, is lost. For instance, all server(s) in the storage control layer could have simultaneously failed due to a spark that hit the electricity system and caused severe damage to the server(s), or due to kernel panic. In this scenario, dirty data which was kept in cache, even if redundantly, will be lost and cannot be recovered. In addition, some metadata could have been lost because metadata corresponding to recent changes was not stored safely, and/or because a journal in which are registered metadata changes between two instances of metadata storing was not stored safely. Therefore, when the server (s) is/are repaired and the storage system is restarted it can be unclear whether or not the stored data can be used. By way of example, because of the lost metadata it can be unclear whether or not the data that is permanently stored in the storage space represents an order-preservation data consistency condition important for crash consistency of databases and different applications.

The problems of crash-tolerant storage systems have been recognized in the contemporary art and various systems have been developed to provide a solution, for example:

U.S. Pat. No. 7,363,633 (Goldick et al) discloses an application programming interface protocol for making requests to registered applications regarding applications' dependency information so that a table of dependency information relating to a target object can be recursively generated. When all of the applications' dependencies are captured at the same time for given volume(s) or object(s), the entire volume's or object's program and data dependency information may be maintained for the given time. With this dependency information, the computer system advantageously knows not only which files and in which order to freeze or flush files in connection with a backup, such as a snapshot, or restore of given volume(s) or object(s), but also knows which volume(s) or object(s) can be excluded from the freezing process. After a request by a service for application dependency information, the computer system can translate or process dependency information, thereby ordering recovery events over a given set of volumes or objects.

U.S. Patent Application Publication Number 2010/ 0169592 (Atluri et al) discloses methods, software suites, and systems of generating a recovery snapshot and creating a virtual view of the recovery snapshot. In an embodiment, a method includes generating a recovery snapshot at a predetermined interval to retain an ability to position forward and backward when a delayed roll back algorithm is applied and creating a virtual view of the recovery snapshot using an algorithm tied to an original data, a change log data, and a consistency data related to an event. The method may include redirecting an access request to the original data based on a meta-data information provided in the virtual view. The method may further include substantially retaining a timestamp data, a location of a change, and a time offset of the change as compared with the original data.

U.S. Patent Application Publication Number 2005/ 0060607 (Kano) discloses restoration of data facilitated in the storage system by combining data snapshots made by the storage system itself with data recovered by application programs or operating system programs. This results in snapshots which can incorporate crash recovery features incorporated in application or operating system software in addition to the usual data image provided by the storage subsystem.

U.S. Patent Application Publication Number 2007/ 0220309 (Andre et al) discloses a continuous data protection system, and associated method, for point-in-time data recovery. The system includes a consistency group of data volumes. A support processor manages a journal of changes to the set of volumes and stores meta-data for the volumes. A storage processor processes write requests by: determining if the write request is for a data volume in the consistency group; notifying the support processor of the write request including providing data volume meta-data; and storing modifications to the data volume in a journal. The support processor receives a data restoration request including identification of the consistency group and a time for data restoration. The support processor uses the data volume meta-data to reconstruct a logical block map of the data volume at the requested time and directs the storage processor to make a copy of the data volume and map changed blocks from the journal into the copy.

U.S. Patent Application Publication Number 2006/ 0041602 (Lomet et al) discloses logical logging to extend recovery. In one aspect, a dependency cycle between at least two objects is detected. The dependency cycle indicates that the two objects should be flushed simultaneously from a volatile main memory to a non-volatile memory to preserve those objects in the event of a system crash. One of the two objects is written to a stable of to break the dependency cycle. The other of the two objects is flushed to the non-volatile memory. The object that has been written to the stable log is then flushed to the stable log to the non-volatile memory.

U.S. Patent Application Publication Number 2007/ 0061279 (Christiansen et al) discloses file system metadata regarding states of a file system affected by transactions tracked consistently even in the face of dirty shutdowns which might cause rollbacks in transactions which have already been reflected in the metadata. In order to only request time- and resource-heavy rebuilding of metadata for metadata which may have been affected by rollbacks, reliability information is tracked regarding metadata items. When a metadata item is affected by a transaction which may not complete properly in the case of a problematic shutdown or other event, that metadata item's reliability information indicates that it may not be reliable in case of such a problematic ("dirty" or "abnormal") event. In addition to flag information indicating unreliability, timestamp information tracking a time of the command which has made a metadata item unreliable is also maintained. This timestamp information can then be used, along with information regarding a period after which the transaction will no longer cause a problem in the case of a problematic event, in order to reset the reliability information to indicate that the metadata item is now reliable even in the face of a problematic event.

SUMMARY

In accordance with certain aspects of the presently disclosed subject matter, there is provided a method of operating a storage system which includes a cache memory operatively coupled to a physical storage space comprising a plurality of disk drives, the method comprising providing storing data in the physical storage in a recurring manner, wherein each storage recurrence comprises: upon start of a storage recurrence, destaging dirty data which had been accommodated in the cache memory prior to the start of the storage recurrence thus giving rise to destaged data group, wherein destaging is provided with no overwriting of at least superseded data destaged before starting the storage recurrence whilst enabling retaining metadata indicative of location of the superseded data in the physical storage space; accommodating data obtained in the cache memory subsequent to the start of the storage recurrence whilst preventing the data from being destaged during the storage recurrence, thus giving rise to accommodated data group; and registering a point-in-time indicative of successful destaging of the destaged data group, thereby providing an order-preservation consistency indication corresponding to the recurrence.

In some of these aspects, if a total crash happened during the storage recurrence, the method further comprises: restoring the storage system to a state of the system immediately before the crash and then returning the storage system to a data consistency condition using the superseded data and respective retained metadata corresponding to an order-preservation consistency indication provided in a previous recurrence.

Additionally or alternatively, in some of these aspects, time intervals between the storage recurrences have equal duration.

Additionally or alternatively, in some of these aspects, a frequency of storage recurrences is dynamically adjustable.

Additionally or alternatively, in some of these aspects, the storage recurrence is initiated by the storage system if happens at least one of the following events selected from a group comprising: power instability meets a predefined condition, cache overload meets a predefined condition, kernel panic actions taken by an operational system.

Additionally or alternatively, in some of these aspects, the preventing includes: segregating in the cache memory the destaged data group from the accommodated data group. In some examples of these aspects, the segregating includes: queuing the accommodated data group in a second data structure separated from a first data structure used for queuing the destaged data group. Additionally or alternatively, in some examples of these aspects, the segregating includes associating the accommodated data group with a checkpoint indicating a separation point between the accommodated data group and the destaged data group in a caching data structure in the cache memory.

Additionally or alternatively, in some of these aspects, the method further comprises: predefining one or more logical volume corresponding to a consistency class, wherein data in the destaged data group and data in the accommodated data group are associated with the logical volumes.

Additionally or alternatively, in some of these aspects, the destaging is provided in write-out-of-place manner.

In accordance with further aspects of the presently disclosed subject matter, there is provided a method of operating a storage system which includes a cache memory operatively coupled to a physical storage space comprising a plurality of disk drives, the method comprising providing storing data in the physical storage in a recurring manner, wherein each storage recurrence comprises: upon start of a storage recurrence, destaging dirty data which had been accommodated in the cache memory prior to the start of the storage recurrence thus giving rise to destaged data group, wherein destaging is provided with no overwriting at least superseded data destaged before starting the storage recurrence; accommodating data obtained in the cache memory subsequent to the start of the storage recurrence whilst preventing the data from being destaged during the storage recurrence, thus giving rise to accommodated data group; registering details of storage transactions during the storage recurrence in a manner enabling retaining metadata indicative of location of the superseded data in the physical storage space, thus giving rise to registered transaction and time thereof; and registering a point-in-time indicative of successful destaging of the destaged data group, thereby providing an order-preservation consistency indication corresponding to the recurrence.

In some of these aspects, if a total crash happened during the storage recurrence, the method further comprises restoring the storage system to a state of the system immediately before the crash and then returning the storage system to a data consistency condition, wherein the restoring comprises: executing all the registered transactions, and wherein the returning comprises: rolling back the transactions registered after the registered point-in-time, providing recovery in accordance with data and metadata corresponding to an order-preservation consistency indication corresponding to a previous recurrence. In some examples of these aspects, the method further comprises: remapping virtual addresses of destaged data to physical addresses of corresponding superseded data.

In accordance with further aspects of the of the presently disclosed subject matter, there is provided a storage system comprising: a physical storage space comprising a plurality of disk drives; and a cache memory, operatively coupled to the physical storage space; the storage system being operable to store data in the physical storage in a recurring manner, including being operable, for each storage recurrence, to: upon start of a storage recurrence, destage dirty data which had been accommodated in the cache memory prior to the start of the storage recurrence thus giving rise to destaged data group, wherein destaging is provided with no overwriting of at least superseded data destaged before starting the storage recurrence whilst enabling retaining metadata indicative of location of the superseded data in the physical storage space; accommodate data obtained in the cache memory subsequent to the start of the storage recurrence whilst preventing the data from being destaged during the storage recurrence, thus giving rise to accommodated data group; and register a point-in-time indicative of successful destaging of the destaged data group, thereby providing an order-preservation consistency indication corresponding to the recurrence.

In some of these aspects, the storage system is further operable, if a total crash happened during the storage recurrence, to restore the storage system to a state of the system immediately before the crash and then to return the storage system to a data consistency condition using the superseded data and respective retained metadata corresponding to an order-preservation consistency indication provided in a previous recurrence.

In some of these aspects, time intervals between storage recurrences have equal duration.

In some of these aspects, the storage recurrence is initiated by the storage system if happens at least one of the following events selected from a group comprising: power instability meets a predefined condition, cache overload meets a predefined condition, kernel panic actions taken by an operational system.

In some of these aspects, the preventing includes: segregating in the cache memory the destaged data group from the accommodated data group.

In some of these aspects, the storage system is further operable to predefine one or more logical volume corresponding to a consistency class, wherein data in the destaged data group and data in the accommodated data group are associated with the logical volumes.

In accordance with further aspects of the of the presently disclosed subject matter, there is provided a computer program product comprising a non-transitory computer useable medium having computer readable program code embodied therein for operating a storage system which includes a cache memory operatively coupled to a physical storage space comprising a plurality of disk drives, the computer readable program code including computer readable program code for providing storing data in the physical storage space in a recurring manner, the computer program product comprising for each storage recurrence: computer readable program code for causing the computer to, upon start of a storage recurrence, destage dirty data which had been accommodated in the cache memory prior to the start of the storage recurrence thus giving rise to destaged data group, wherein destaging is provided with no overwriting of at least superseded data destaged before starting the storage recurrence whilst enabling retaining metadata indicative of location of the superseded data in the physical storage space; computer readable program code for causing the computer to accommodate data obtained in the cache memory subsequent to the start of the storage recurrence whilst preventing the data from being destaged during the storage recurrence, thus giving rise to accommodated data group; and computer readable program code for causing the computer to register a point-in-time indicative of successful destaging of the destaged data group, thereby providing an order-preservation consistency indication corresponding to the recurrence.

BRIEF DESCRIPTION OF THE DRAWINGS

In order to understand the subject matter and to see how it can be carried out in practice, examples will be described, with reference to the accompanying drawings, in which.

DETAILED DESCRIPTION

In the following detailed description, numerous specific details are set forth in order to provide a thorough understanding of the presently disclosed subject matter. However, it will be understood by those skilled in the art that the presently disclosed subject matter can be practiced without these specific details. For instance, well-known methods, procedures, components and circuits have not been described in detail so as not to obscure the presently disclosed subject matter.

As used herein, the phrases "for example," "such as", "for instance", "e.g." and variants thereof describe non-limiting embodiments of the subject matter.

Unless specifically stated otherwise, as apparent from the following discussions, it is appreciated that throughout the specification discussions utilizing terms such as "providing", "storing", "destaging", "overwriting", "starting", "enabling", "retaining", "accommodating", "preventing", "registering", "returning", "using", "adjusting", "initiating", "segregating", "queuing", "associating", "predefining", "registering", "executing", "rolling", and "remapping". or the like, refer to the action and/or processes of a computer that manipulate and/or transform data into other data, said data represented as physical, such as electronic, quantities and/or said data representing the physical objects. The term "computer" should be expansively construed to cover any kind of electronic system with data processing capabilities, including, for example, storage system and part(s) thereof disclosed in the present application.

The operations in accordance with the teachings herein can be performed by a computer specially constructed for the desired purposes or by a general purpose computer specially configured for the desired purpose by a computer program stored in a computer readable storage medium.

The references cited in the background teach many principles of recovery that are applicable to the presently disclosed subject matter. Therefore the full contents of these publications are incorporated by reference herein where appropriate for technical background, and/or for teachings of additional and/or alternative details.

Embodiments of the presently disclosed subject matter are not described with reference to any particular programming language. It will be appreciated that a variety of programming languages can be used to implement the teachings of the presently disclosed subject matter as described herein.

Figure 1:
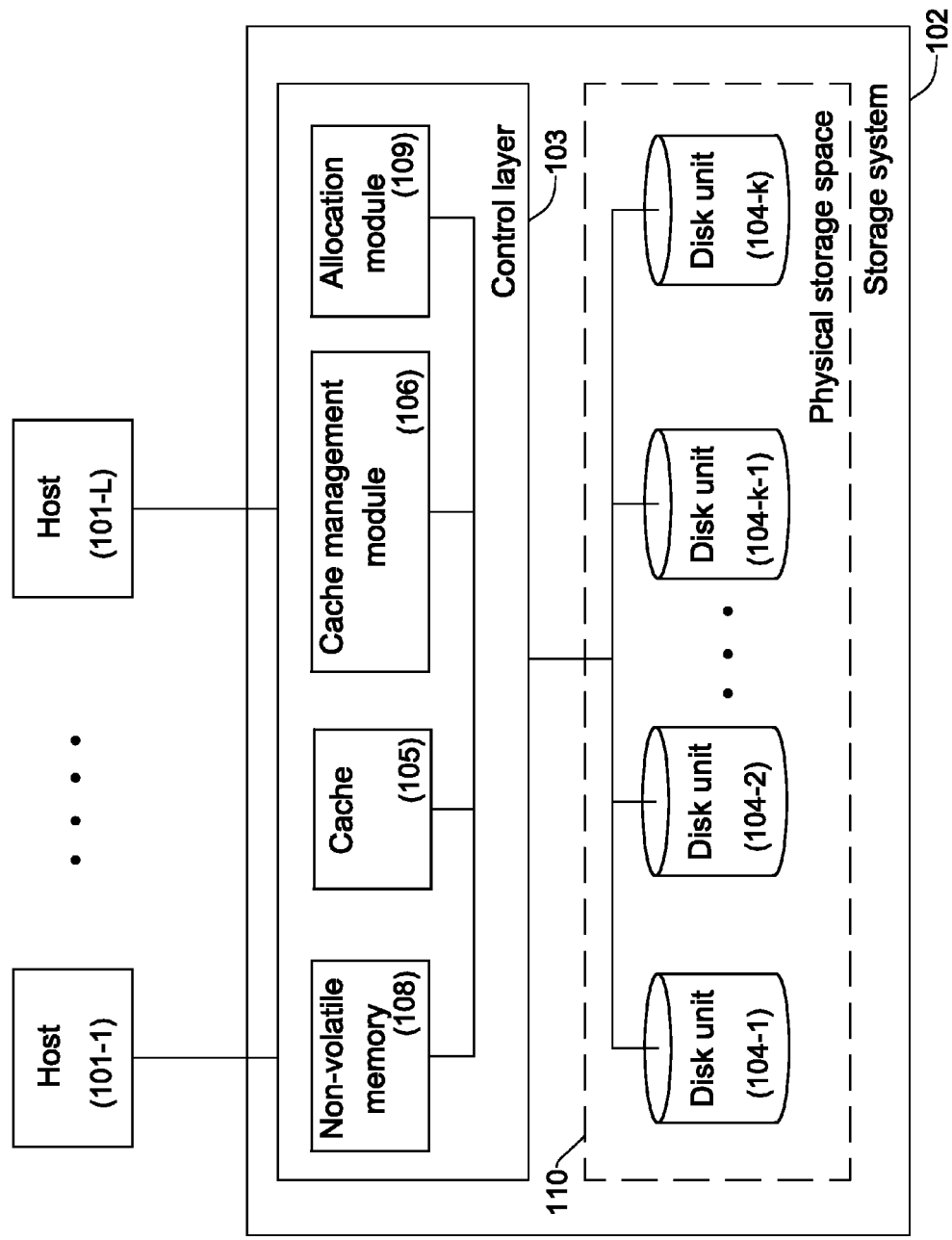
FIG. 1 illustrates an example of a functional block-diagram of a storage system, in accordance with certain embodiments of the presently disclosed subject matter.

Bearing this in mind, attention is drawn to FIG. 1 illustrating an example of a functional block-diagram of a storage system, in accordance with certain embodiments of the presently disclosed subject matter.

One or more external host computers illustrated as host(s) 101 (e.g. 101-1-101-L) share common storage means provided by a storage system 102. Storage system 102 comprises a storage control layer 103 (also referred to herein as "control layer") and a physical storage space 110 (also referred to herein as "storage space" or "physical storage"). Storage control layer 103, comprising one or more servers, is operatively coupled to host(s) 101 and to physical storage space 110, wherein storage control layer 103 is configured to control interface operations (including I/O operations) between host(s) 101 and physical storage space 110. Optionally, the functions of control layer 103 can be fully or partly integrated with one or more host(s) 101 and/or physical storage space 110 and/or with one or more communication devices enabling communication between host(s) 101 and physical storage space 110.

Physical storage space 110 can be implemented using any appropriate permanent (non-volatile) data storage device(s) including, for example, one or more Solid State Disk (SSD) drives, Hard Disk Drives (HDD) and/or one or more disk units (DUs) (e.g. disk units 104-1-104-k), comprising several disk drives. Possibly, the DUs (if included) can comprise relatively large numbers of drives, in the order of 32 to 40 or more, of relatively large capacities, typically although not necessarily 1-2 TB. Possibly, physical storage space 110 can include disk drives not packed into disk units. Storage control layer 103 and physical storage space 110 can communicate with host(s) 101 and within storage system 102 in accordance with any appropriate storage protocol.

Storage control layer 103 can be configured to support any appropriate write-in-place and/or write-out-of-place technique, when receiving a write request. In a write-in-place technique a modified data block is written back to its original physical location in the storage space, overwriting the superseded data block. In a write-out-of-place technique a modified data block is written (e.g. in log form) to a different physical location than the original physical location in storage space 110 and therefore the superseded data block is not overwritten by the modified data. For the purpose of the discussion herein, data deletion is considered to be an example of data modification and a superseded data block refers to a data block which has been superseded due to data modification.

Similarly, when receiving a read request, storage control layer 103 is configured to identify the physical location of the desired data and further process the read request accordingly.

Optionally, storage control layer 103 can be configured to handle a virtual representation of physical storage space 110 and to facilitate mapping between physical storage space 110 and its virtual representation. Stored data can be logically represented to a client in terms of logical objects. Depending on the storage protocol, the logical objects can be logical volumes, data files, image files, etc. A logical volume (also known as logical unit) is a virtual entity logically presented to a client as a single virtual storage device. The logical volume represents a plurality of data blocks characterized by successive Logical Block Addresses (LBA). Different logical volumes can comprise different numbers of data blocks, while the data blocks are typically, although not necessarily, of equal size (e.g. 512 bytes). Blocks with successive LBAs can be grouped into portions that act as basic units for data handling and organization within storage system 102. Thus, for instance, whenever space is to be allocated in physical storage space 110 in order to store data, this allocation can be done in terms of data portions. Data portions are typically, although not necessarily, of equal size throughout the system. (For example, the size of data portion can be 64 Kbytes). In embodiments with virtualization, the virtualization functions can be provided in hardware, software, firmware or any suitable combination thereof. In embodiments with virtualization, the format of logical representation provided by control layer 103 is not necessarily the same for all interfacing applications.

Storage control layer 103 illustrated in FIG. 1 comprises: a volatile cache memory 105, a cache management module 106, an allocation module 109, and optionally a control layer non-volatile memory 108 (e.g. service disk drive). Any of cache memory 105, cache management module 106, control layer non-volatile memory 108, and allocation module 109 can be implemented as a centralized module operatively connected to all of the server(s) comprised in storage control layer 103, or can be distributed over part of or all of the server(s) comprised in storage control layer 103.

Volatile cache memory 105 [e.g. (Random Access Memory) RAM memory in each server comprised in storage control layer 103] temporarily accommodates the data to be written to physical storage space 110 in response to a write command and/or or temporarily accommodates the data to be read from physical storage space 110 in response to a read command.

During a write operation the data is temporarily retained in cache memory 105 until subsequently written to storage space 110. Such temporarily retained data is referred to hereinafter as "write-pending" data or "dirty data". Once the write-pending data is sent (also referred to as "stored" or "destaged") to storage space 110, its status is changed from "write-pending" to "non-write-pending", and storage system 102 relates to this data as stored in storage space 110 and allowed to be erased from cache memory 105. Such data is referred to hereinafter as "clean data".

Storage system 102 acknowledges a write request when the respective data has been accommodated in cache memory 105. The write request is acknowledged prior to the write-pending data being stored in storage space 110. However, "dirty" data in volatile cache memory 105 can be lost during a total crash in which the ability to control the transfer of data between cache memory 105 and storage space 110 within storage system 102 is lost. For instance, all server(s) comprised in storage control layer 103 could have simultaneously failed due, for example, to a spark that hit the electricity system and caused severe damage to the server(s), or due to kernel panic, and therefore such an ability could have been lost.

Cache management module 106 is configured to regulate activity in cache memory 105, including destaging dirty data from cache memory 105.

Allocation module 109 is configured to allocate physical location for storing the destaged data. For instance, the allocation can include updating metadata indicative of data physical location. The form and content of metadata which is indicative of data physical location is not limited by the currently disclosed subject matter. For the purpose of illustration only, an example will now be presented where metadata can include mapping information such as one or more mapping trees. Mapping information (e.g. a mapping tree having a trie configuration or e.g. any other mapping data structure) can provide, for instance, mapping between one or more contiguous ranges of logical block addresses and one or more contiguous ranges of addresses related to the physical address space. U.S. application Ser. No. 12/897,119, filed on Oct. 4, 2010, and assigned to the assignee of the present application describes an example of mapping and is hereby incorporated by reference herein.

Allocation module 109 is configured to retain metadada indicative of the physical location of certain superseded data, for instance in a table, journal or other data structure which registers storage transaction details as will be described in more detail with reference to FIG. 2.

Allocation module 109 is configured to register a point in time indicative of a successful destaging of a destaged data group as will be described in more detail with reference to FIG. 2.

Figure 2:
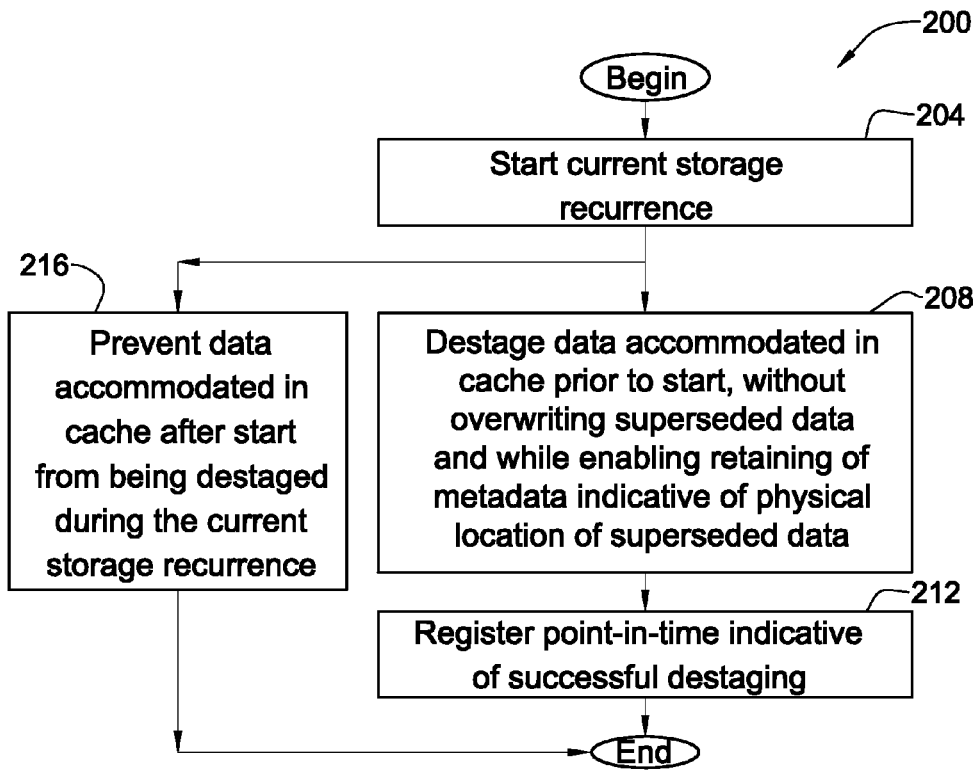
FIG. 2 is a flow-chart of a method of operating a storage system in which storing data is provided in the physical storage, in accordance with certain embodiments of the presently disclosed subject matter.

Storage system 102 can operate as illustrated in FIG. 2 which is a flow-chart of a method 200 in which storing data is provided in the physical storage in accordance with certain embodiments of the presently disclosed subject matter.

In a conventional manner of destaging, the data in cache memory 105 is not necessarily destaged in the same order that the data was accommodated in cache memory 105 because the destaging can take into account other consideration(s) in addition to or instead of the order in which the data was accommodated. Data destaging can be conventionally performed by way of any replacement technique. For example, a possible replacement technique can be a usage-based replacing technique. A usage-based replacing technique conventionally includes an access based movement mechanism in order to take into account certain usage-related criteria when destaging data from cache memory 105. Examples of usage-based replacing techniques include known in the art LRU (Least Recently Used) technique, LFU (Least Frequently Used) technique, MFU (Most Frequently Used) technique, weighted-LRU techniques, pseudo-LRU techniques, etc.

Order preservation is a type of consistency where if a first write command for writing a first data value is received before a second write command for writing a second data value, and the first command was acknowledged, then if the second data value is stored in storage space 110, the first data value is necessarily also stored in storage space 110. As conventional destaging does not necessarily destage data in the same order that the data was accommodated, conventional destaging does not necessarily result in order preservation consistency. It is therefore possible that even if the second data value is already stored in storage space 110, the first data value can still be in cache memory 105 and would be lost upon a total crash where the ability to control the transfer of data between cache memory 105 and storage space 110 within storage system 102 is lost.

Embodiments of method 200 which will now be described enable data in storage space 110 to be returned to a data consistency condition (in terms of order preservation), if a total crash happens. Herein the term data consistency or the like refers to order-preservation data consistency. The disclosure does not limit the situations where it can be desirable to be able to return data to a data consistency condition but for the purpose of illustration only, some examples are now presented. For example, when updating a file system, it can be desirable that there be data consistency between metadata modification of a file system and data modification of a file system so that if the metadata modification of the file system is stored in storage space 110, the data modification of the file is necessarily also stored in storage space 110. Additionally or alternatively for example, it can be desirable that there be data consistency between a journal for possible recovery of a database and data in a database so that if the journal for possible recovery of a database is stored in the storage space 110, the data in the database is necessarily also stored in the storage space 110.

For purpose of illustration only, method 200 is described below with the assumption of enabling the returning of all data (also termed herein "the entire dataset") in storage space 110 to a data consistency condition, if a total crash happens. However, those skilled in the art will readily appreciate that method 200 can be applicable in a similar manner when enabling the returning of only some not all of the data in storage space 110 to a data consistency condition, if a total crash happens. For example, storage system 102 (e.g. allocation module 109) can predefine a consistency class including one or more logical volumes. In this example, the decision on whether or not to include a logical volume in a consistency class can be at least partly based, for instance, on whether or not the requests received from hosts 101 relating to that logical volume imply that it would be desirable to be able to return the data corresponding to that logical volume to a data consistency condition, if a total crash happens. In this example, method 200 can be required to be performed for data which corresponds to the predefined consistency class, thereby enabling data in storage space 110 which corresponds to the predefined class to be returned to a data consistency condition, if a total crash happens. (In this example, method 200 can optionally also be performed or can alternatively not be performed for data not corresponding to the pre-defined class).

In accordance with method 200 data accommodated in cache memory 105 is destaged to storage space 110 during the storage recurrence which starts after the data has been accommodated. Because the frequency of storage recurrences, and/or time intervals between storage recurrences are not limited by the currently disclosed subject matter, FIG. 2 does not illustrate a plurality of storage recurrences nor any relationship between them. Moreover, for simplicity's sake, FIG. 2 shows a common end although the duration of stage 216 does not necessarily equal the combined duration of stages 208 and 212.

Referring now to the various stages of method 200, the storage system 102 (e.g. cache management module 106) starts (204) a storage recurrence, (referred to below as the "current storage recurrence").

During the current storage recurrence storage system 102 (e.g. cache management module 106) destages (208) data which had been accommodated in cache memory 105 prior to the start of the current storage recurrence. The data that will be destaged during the current storage recurrence is also termed herein "destaged data group". Regardless of whether the storage system 102 applies a write in place or write out of place when destaging data, there is no overwriting of at least superseded data that was destaged to storage space 110 prior to the start of the current storage recurrence. For example, if a write-in-place technique is being used, then any modified data can be stored in a temporary location until the end of the current storage recurrence, with the physical location of superseded data only updated by the corresponding modified data after the end of the current storage recurrence. If a write out of place technique is being used, for example, then inherent to the technique, the modified data will be stored in a different physical location than that of the superseded data. Additionally, storage system 102 (e.g. allocation module 109) enables retaining of metadata indicative of the physical location in physical storage space 110 of superseded data that was destaged to storage space 110 prior to the start of the current storage recurrence. For instance, storage system 102 can write such metadata to a table, journal or other data structure indicative of an order and/or time of the respective transactions. Continuing with the latter instance, storage system can optionally register storage transactions during the current storage recurrence in a manner enabling retaining of metadata indicative of location in physical storage space 110 of superseded data that was destaged to storage space 110 prior to the start of the current storage recurrence, thus giving rise to registered transactions and times thereof.

After the current storage recurrence has been successfully completed, storage system 102 (e.g. allocation module 109) registers (212) a point in time indicative of successful destaging of the destaged data group thereby providing an order preservation consistency indication corresponding to the current storage recurrence. For instance, the point in time can be registered in a journal which registers storage transaction details.

Optionally, after registering the point in time indicative of successful destaging, the storage system (e.g. allocation module) can cease retaining metadata indicative of physical location of superseded data that was destaged to storage space 110 prior to the start of the current storage recurrence and/or cease preventing overwriting of the superseded data.

The storage system 102 (e.g. cache management module 106) prevents (216) data accommodated in cache memory after the start of the current storage recurrence from being destaged during the current storage recurrence. This data which is accommodated in cache memory 105 after the start of the current storage recurrence is also termed herein "accommodated data group".

For example, the prevention of destaging can include segregating in any appropriate manner the accommodated data group from the destaged data group in cache memory 105.

For instance, segregating can include queuing the accommodated data group in a second caching data structure in cache memory 105 separated from a first caching data structure in cache memory 105 used for queuing the destaged data group. For purpose of illustration only assume that the second data structure is a separate data LRU linked list, with a plurality of elements representing the accommodated data group queued in this LRU list. Those skilled in the art will readily appreciate that the separate data structure can alternatively include any other appropriate data structure associated with any appropriate replacement technique.

Additionally or alternatively, segregating can include, for instance, associating the accommodated data group with a checkpoint indicating a separation point between the accommodated data group and the destaged data group in a caching data structure in cache memory 105.

The checkpoint can be, for example, a recognizable kind of data identifiable by a certain flag in its header. Cache management module 106 can be configured to check the header of an element (e.g. before evicting it from the data structure), and, responsive to recognizing a checkpoint, to handle the checkpoint in an appropriate manner. For instance, a possible appropriate manner of handing a checkpoint can include cache management module 106 waiting until the start of the next storage recurrence before removing the checkpoint from the data structure, and before destaging the accommodated data group associated with the checkpoint.

For purpose of illustration only, assume that the caching data structure in this instance is an LRU linked list. Those skilled in the art will readily appreciate that the separate data structure can alternatively include any other appropriate data structure associated with any appropriate replacement technique.

Figure 3:
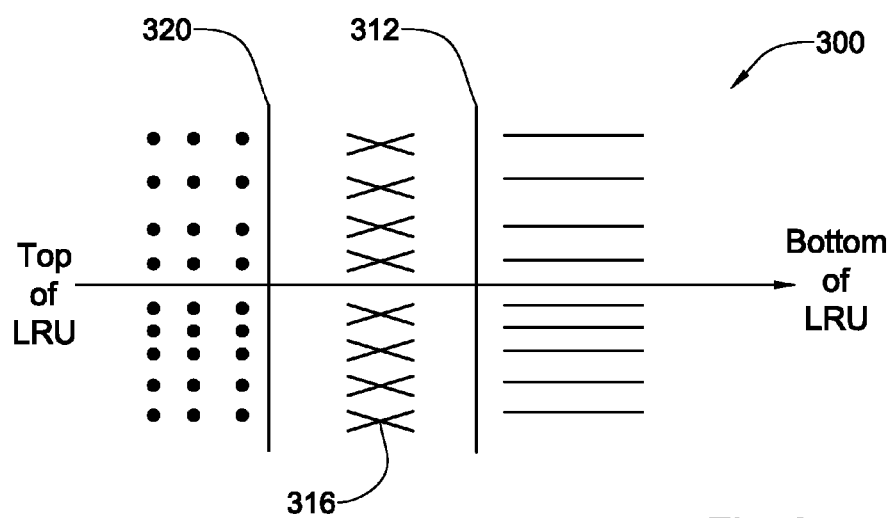
FIG. 3 illustrates a least recently used (LRU) list, in accordance with certain embodiments of the presently disclosed subject matter.

FIG. 3 illustrates a sequence of checkpoints and elements representing cache data in an LRU data linked list 300, in accordance with certain embodiments of the presently disclosed subject matter. An LRU linked list (such as list 300) can include a plurality of elements with one of the elements indicated by an external pointer as representing the least recently used data. In an LRU technique, data which is to be destaged earlier is considered represented by an element closer to the bottom of the list. Therefore assuming the checkpoint 312 indicates a separation point between the destaged data group and the accommodated data group, the accommodated data group can be considered as represented by elements 316 which are above checkpoint 312 in LRU list 300. Assume that access-based movement is precluded for elements 316 representing the accommodated data group (or is restricted to movement between checkpoints 312 and 320, where checkpoint 320 would indicate a separation point between the next storage recurrence's destaged and accommodated data groups). Under this assumption, elements 316 representing the accommodated data group, will remain close to checkpoint 312 because an element of LRU linked list 300 whose represented data is accessed while being in cache memory 105 will not be moved back towards the top of list 300, in contrast to a conventional LRU technique with access based movement. Checkpoint 312 and element(s) 316 are prevented from being destaged until the start of the next storage recurrence.

Depending on the example, there can be equal intervals between storage recurrences (e.g. 5 to 10 minutes) or not necessarily equal intervals. In examples, with not necessarily equal intervals, the frequency of storage recurrences can be dynamically adjustable or can be set.

Optionally, a storage recurrence can be initiated by storage system 102 under one or more predefined conditions such as if power instability meets a predefined condition, if cache overload meets a predefined condition, if the operational system takes kernel panic actions, etc.

As mentioned above, method 200 can be adapted for the case of a predefined consistency class of data which does not necessarily correspond to all of the data in storage space 110. For instance, method 200 can be performed for data associated with the class, and not necessarily performed for data not associated with the class. In this instance, data not associated with the class can be handled instead in any suitable way, some of which are known in the art.

Storage system 102 can be returned to a data consistency condition if a total crash happens during a storage recurrence causing a loss in the ability to control the transfer of data between the cache memory 105 and storage space 110, within storage system 102.

Assuming a total crash happened, then once the server(s) have been repaired, storage system 102 (e.g. allocation module 109) can restore the storage system to the state of the system immediately before the crash in any suitable way, some of which are known in the art. Storage system 102 (e.g. allocation module 109) can then use superseded data and respective retained metadata to return the storage system to a data consistency condition corresponding an order preservation consistency indication of a previous storage recurrence (where previous storage recurrence can refer to any storage recurrence which occurred prior to the storage recurrence during which the total crash happened).

For instance, in accordance with the discussion above, data could have been destaged during a previous storage recurrence in a manner which did not overwrite superseded data that was destaged prior to the start of the previous storage recurrence, regardless of whether a write in place or a write out of place technique was being used.

Moreover, the metadata indicative of the location in physical storage space 110 of superseded data that was destaged prior to the start of the previous storage recurrence could have been retained, for instance by writing such metadata to a table or other data structure. For instance, the metadata indicative of the location in physical storage space 110 of superseded data that was destaged prior to the start of the previous storage recurrence could have been retained by registering such metadata in a journal which registers storage transaction details.

Using the superseded data and respective retained metadata, storage system 102 can be returned to a data consistency condition corresponding to an order preservation consistency indication of a previous recurrence. Those skilled in the art will readily appreciate that the storage system can be returned to a data consistency condition with any appropriate technique. However for the sake of further illustration only, an example of one technique will now be described which illustrates recovery in accordance with data and metadata corresponding to an order preservation consistency indication corresponding to a previous recurrence.

In this example, it is assumed that storage transactions during a storage recurrence are registered (e.g. in a journal) in a manner which enables retaining of metadata indicative of location in physical storage space 110 of superseded data that was destaged prior to the start of the storage recurrence, thus giving rise to registered transactions and time thereof. It is also assumed that a point in time indicative of successful destaging of a destaged data group is also registered (e.g. in a journal), thereby providing an order preservation consistency indication corresponding to a recurrence. Therefore, if a total crash happens during a storage recurrence, storage system 102 can first be restored to the state immediately prior to the crash by executing all registered transactions. Storage system 102 can then be returned to a data consistency condition by then rolling back any transactions registered after a registered point in time. Optionally, the returning to a data consistency condition can include remapping virtual addresses of destaged data to physical addresses of corresponding superseded data.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the presently disclosed subject matter.

It is also to be understood that any of the methods described herein can include fewer, more and/or different stages than illustrated in the drawings, the stages can be executed in a different order than illustrated, stages that are illustrated as being executed sequentially can be executed in parallel, and/or stages that are illustrated as being executed in parallel can be executed sequentially. Any of the methods described herein can be implemented instead of and/or in combination with any other suitable storage techniques.

It is also to be understood that certain embodiments of the presently disclosed subject matter are applicable to the architecture of storage system(s) described herein with reference to the figures. However, the presently disclosed subject matter is not bound by the specific architecture; equivalent and/or modified functionality can be consolidated or divided in another manner and can be implemented in any appropriate combination of software, firmware and/or hardware. Those versed in the art will readily appreciate that the presently disclosed subject matter is, likewise, applicable to any storage architecture implementing a storage system. In different embodiments of the presently disclosed subject matter the functional blocks and/or parts thereof can be placed in a single or in multiple geographical locations (including duplication for high-availability); operative connections between the blocks and/or within the blocks can be implemented directly (e.g. via a bus) or indirectly, including remote connection. The remote connection can be provided via Wireline, Wireless, cable, Internet, Intranet, power, satellite or other networks and/or using any appropriate communication standard, system and/or protocol and variants or evolution thereof (for example, Ethernet, iSCSI, Fiber Channel, etc.).

It is also to be understood that for simplicity of description, some of the embodiments described herein ascribe a specific method stage and/or task to a particular module within the storage control layer. However in other embodiments the specific stage and/or task can be ascribed more generally to the storage system or storage control layer, and/or more specifically to any module(s) in the storage system.

It is also to be understood that the system according to the presently disclosed subject matter can be, at least partly, a suitably programmed computer. Likewise, the presently disclosed subject matter contemplates a computer program being readable by a computer for executing the method of the presently disclosed subject matter. The subject matter further contemplates a machine-readable memory tangibly embodying a program of instructions executable by the machine for executing a method of the subject matter.

Those skilled in the art will readily appreciate that various modifications and changes can be applied to the embodiments of the presently disclosed subject matter as hereinbefore described without departing from its scope, defined in and by the appended claims.

The invention claimed is:

1. A method of operating a storage system which includes a cache memory operatively coupled to a physical storage space comprising a plurality of disk drives, the method comprising performing a plurality of storage recurrences for destaging data from the cache memory to the physical storage space, wherein a performing of each storage recurrence comprises:

upon a start of the storage recurrence, destaging first dirty data which had been accommodated in the cache memory prior to the start of said storage recurrence, wherein the destaging of the first dirty data is provided with no overwriting of superseded data that includes data that was destaged before starting said storage recurrence whilst enabling retaining metadata indicative of location of said superseded data in the physical storage space; wherein the destaging of the first dirty data is performed in an order that differs from an order in which the first dirty data had been accommodated in the cache memory;

queuing second dirty data accommodated in said cache memory subsequent to the start of said storage recurrence, wherein the queuing of the second dirty data is in a second data structure that differs from a first data structure used for queuing the first dirty data;

preventing said second dirty data from being destaged during the performing of said storage recurrence and until a start of a next storage recurrence; and registering a point-in-time indicative of a successful destaging of the first dirty data, thereby providing an order-preservation consistency indication corresponding to said storage recurrence.

2. The method of claim 1 wherein, if a total crash happened during said storage recurrence, the method further comprises returning the storage system to an order-preservation consistency condition using said superseded data and the metadata indicative of the location of the superseded data in the physical storage space and corresponding to an order-preservation consistency indication provided in a previous recurrence.

3. The method of claim 1 wherein time intervals between storage recurrences of the plurality of storage recurrences have equal duration.

4. The method of claim 1, wherein a frequency of the plurality of storage recurrences is dynamically adjustable.

5. The method of claim 1 wherein each storage recurrence is initiated by the storage system in response to an occurrence of at least one event selected from a group consisting of: power instability meets a predefined condition, cache overload meets a predefined condition, kernel panic actions taken by an operational system.

6. The method of claim 1 further comprising predefining one or more logical volumes corresponding to a consistency class, wherein the first dirty data and the second dirty data are associated with said one or more logical volumes.

7. The method of claim 1, wherein said destaging is provided in a write-out-of-place manner.

8. A method of operating a storage system which includes a cache memory operatively coupled to a physical storage space comprising a plurality of disk drives, the method comprising performing a plurality of storage recurrences for destaging data from the cache memory to the physical storage space, wherein a performing of each storage recurrence comprises:

upon a start of the storage recurrence, destaging first dirty data which has been accommodated in the cache memory prior to the start of said storage recurrence, wherein the destaging of the first dirty data is provided with no overwriting of superseded data that includes data that was destaged before starting said storage recurrence; wherein the destaging of the first dirty data is performed in an order that differs from an order in which the first dirty data had been accommodated in the cache memory;

queuing second dirty data accommodated in said cache memory subsequent to the start of said storage recurrence, wherein the queuing of the second dirty data is in a second data structure that differs from a first data structure used for queuing the first dirty data;

preventing said second dirty data from being destaged during the performing of said storage recurrence and until a start of a next storage recurrence;

registering details of storage transactions during said storage recurrence in a manner enabling retaining metadata indicative of location of said superseded data in the physical storage space; and registering a point-in-time indicative of successful destaging of the first dirty data, thereby providing an order-preservation consistency indication corresponding to said storage recurrence.

9. The method of claim 8 wherein, if a total crash happened during said storage recurrence, the method further comprises restoring the storage system to a state of the storage system immediately before the total crash and then returning the storage system to a data consistency condition, wherein said restoring comprises: executing all said storage transactions, and wherein said returning comprises: rolling back transactions that were registered after said registered point-in-time, providing recovery in accordance with data and metadata corresponding to an order-preservation consistency indication corresponding to a previous recurrence.

10. The method of claim 9 further comprising remapping virtual addresses of destaged data to physical addresses of corresponding superseded data.

11. A storage system comprising:
a physical storage space comprising a plurality of disk drives; and
a cache memory, operatively coupled to said physical storage space;
said storage system is configured to perform a plurality of storage recurrences for destaging data from the cache memory to the physical storage space, wherein the storage system is configured to perform for each storage recurrence:
upon a start of the storage recurrence, destage first dirty data which had been accommodated in the cache memory prior to the start of said storage recurrence, wherein the destaging of the first dirty data is provided with no overwriting of superseded data that includes data that was destaged before starting said storage recurrence whilst enabling retaining metadata indicative of location of said superseded data in the physical storage space; wherein the destaging of the first dirty data is performed in an order that differs from an order in which the first dirty data had been accommodated in the cache memory;
queue second dirty data accommodated in said cache memory subsequent to the start of said storage recurrence, wherein the queuing of the second dirty data is in a second data structure that differs from a first data structure used for queuing the first dirty data;
preventing said second dirty data from being destaged during the performing of said storage recurrence and until a start of a next storage recurrence; and
register a point-in-time indicative of a successful destaging of the first dirty data, thereby providing an order-preservation consistency indication corresponding to said storage recurrence.

12. The storage system of claim 11, further operable, if a total crash happened during said storage recurrence, to return the storage system to an order-preservation consistency condition using said superseded data and the metadata indicative of the location of the superseded data in the physical storage space and corresponding to an order-preservation consistency indication provided in a previous recurrence.

13. The storage system of claim 11, wherein time intervals between storage recurrences of the plurality of storage recurrences have equal duration.

14. The storage system of claim 11, wherein each storage recurrence is initiated by the storage system in response to an occurrence of at least one event selected from a group consisting of: power instability meets a predefined condition, cache overload meets a predefined condition, kernel panic actions taken by an operational system.

15. The storage system of claim 11, further operable to predefine one or more logical volumes corresponding to a consistency class, wherein the first dirty data and the second dirty data are associated with said one or more logical volumes.

16. A computer program product comprising a non-transitory computer useable medium having computer readable program code embodied therein for operating a storage system which includes a cache memory operatively coupled to a physical storage space comprising a plurality of disk drives, said computer readable program code including computer readable program code for perform a plurality of storage recurrences for destaging data from the cache memory to the physical storage space, the computer program product comprising for each storage recurrence:
computer readable program code for causing the computer to, upon a start of the storage recurrence, destage first dirty data which had been accommodated in the cache memory prior to the start of said storage recurrence, wherein the destaging of the first dirty data is provided with no overwriting of superseded data that includes data that was destaged before starting said storage recurrence whilst enabling retaining metadata indicative of location of said superseded data in the physical storage space; wherein the destaging of the first dirty data is performed in an order that differs from an order in which the first dirty data had been accommodated in the cache memory;
computer readable program code for causing the computer to queue second dirty data accommodated in said cache memory subsequent to the start of said storage recurrence, wherein the queuing of the second dirt data is in a second data structure that differs from a first data structure used for queuing the first dirty data;
computer readable program code for causing the computer to prevent said second dirty data from being destaged during the performing of said storage recurrence and until a start of a next storage recurrence; and
computer readable program code for causing the computer to register a point-in-time indicative of successful destaging of the first dirty data, thereby providing an order-preservation consistency indication corresponding to said storage recurrence.

* * * * *